United States Patent
Tobinaga

(10) Patent No.: US 9,057,360 B2
(45) Date of Patent: Jun. 16, 2015

(54) WIND POWER GENERATOR AND YAW BEARING REPLACEMENT METHOD FOR A WIND POWER GENERATOR

(75) Inventor: Ikuo Tobinaga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 789 days.

(21) Appl. No.: 13/310,585

(22) Filed: Dec. 2, 2011

(65) Prior Publication Data
US 2012/0139257 A1 Jun. 7, 2012

(30) Foreign Application Priority Data

Dec. 6, 2010 (JP) .................................. 2010-271292

(51) Int. Cl.
*F03D 11/04* (2006.01)
*F03D 1/00* (2006.01)

(52) U.S. Cl.
CPC ................ *F03D 11/04* (2013.01); *F03D 1/003* (2013.01); *F05B 2230/61* (2013.01); *F05B 2230/70* (2013.01); *F05B 2230/80* (2013.01); *F05B 2240/50* (2013.01); *F05B 2240/916* (2013.01); *Y02E 10/726* (2013.01); *Y02E 10/728* (2013.01)

(58) Field of Classification Search
CPC ..... F03D 1/003; F03D 11/04; F05B 2230/61; F05B 2230/70; F05B 2230/80; F05B 2240/916; B23P 6/002
USPC .................... 415/1; 416/9, 13; 29/889.1, 889, 29/898.01, 402.03, 402.08, 426.1, 426.3
See application file for complete search history.

(56) References Cited

U.S. PATENT DOCUMENTS

| | | | |
|---|---|---|---|
| 2003/0039419 A1* | 2/2003 | Wobben | 384/275 |
| 2010/0135797 A1 | 6/2010 | Nies | |
| 2011/0138595 A1* | 6/2011 | Shiraishi et al. | 29/402.03 |

FOREIGN PATENT DOCUMENTS

| | | |
|---|---|---|
| EP | 1677007 A2 * | 7/2006 |
| EP | 2 388 480 A1 | 11/2011 |
| JP | 2002-248560 A | 9/2002 |
| JP | 2004-293455 | 10/2004 |
| JP | 2009-2175 | 1/2009 |
| WO | 02/34664 | 5/2002 |
| WO | WO 2010/063289 A2 | 6/2010 |

OTHER PUBLICATIONS

English translation of JP2002248560 from ESPACEnet retrieved on Sep. 5, 2014.*
European Search Report dated Nov. 26, 2012 (Five (5) pages).

* cited by examiner

*Primary Examiner* — Edward Look
*Assistant Examiner* — Jesse Prager
(74) *Attorney, Agent, or Firm* — Crowell & Moring LLP

(57) ABSTRACT

The object of the invention is to provide a wind power generator whose yaw bearing can be replaced by a simple device. A wind power generator has a nacelle, a tower that supports the nacelle at a high location, a yaw bearing that is located between a first bearing seat that is provided on the bottom section of the nacelle and a second bearing seat that is provided on the top section of the tower, first and second jack seats that extend to the outer diameter side of the first and second bearing seats, a jack-up unit that is located between the first and second jack seats so that there is a space though which the yaw bearing can be removed or installed in the radial direction of the yaw bearing, and that can jack up the nacelle, and a suspension unit that is provided on the nacelle and that can move while suspending the yaw bearing.

4 Claims, 5 Drawing Sheets

WIND POWER GENERATOR AND YAW BEARING REPLACEMENT METHOD FOR A WIND POWER GENERATOR

CROSS REFERENCE TO RELATED APPLICATIONS

This application claims priority under 35 U.S.C. 119 based upon Japanese Patent Application Serial No. 2010-271292, filed on Dec. 6, 2010. The entire disclosures of the aforesaid applications are incorporated herein by reference.

FIELD OF THE INVENTION

The present invention relates to a wind power generator and a yaw bearing replacement method for a wind power generator, and more particularly to those which make replacement of the yaw bearing possible with a simple device.

BACKGROUND OF THE INVENTION

A wind power generator comprises a generator located inside a nacelle that is supported in a high place by a tower, with the generator being driven by a rotor. A yaw bearing is provided between the nacelle and tower, and supports the nacelle such that the nacelle can rotate in the yaw direction.

Conventionally, when such a yaw bearing became broken for some reason and required replacement, a large crane or the like was used to remove the nacelle and lower the nacelle to the ground, where work to replace the yaw bearing was performed. However, in that case, the cost of the large crane, the cost of labor, the cost of preparing the ground in order to locate the crane and the like, as well as other costs related to the cost of the yaw bearing itself becomes very large.

Moreover, after the tower has been constructed, cancelling the lease of the surrounding ground, restoring the preparations for work to the current state, turning the area into a park, bringing in large, heavy equipment into the area and the like is often not expected, so performing work using a large crane must be avoided as much as possible.

As conventional technology related to maintenance of a wind power generator at high locations of a wind turbine tower, Japanese Laid-open Patent Publication No. 2004-293455 discloses a method of providing a gondola that is raised over a guide rail along the direction of the blades such that workers can ride the gondola and perform maintenance on the blades. Japanese Laid-open Patent Publication No. 2004-512244 discloses a method where in order to perform work such as replacement of component parts in the engine chamber at the top of a wind turbine tower, a service crane for performing work is raised by a permanently installed crane, and work is performed after temporarily securing the service crane to the top of the tower.

Moreover, Japanese Laid-open Patent Publication No. 2009-002175 discloses a method of using a permanently installed winch, which is provided in a girder that moves inside the nacelle, to raise a forward/reverse winch used to exchange equipment that is used for the replacement of wind turbine and a balance that supports equipment for wind turbine, and performing work to replace the winch.

However, by using the conventional technology described above, it is difficult to replace the yaw bearing from the installation position of the bearing, and technology is desired that would allow the replacement of the yaw bearing without the use of a large crane.

SUMMARY OF THE INVENTION

The object of the present invention is to provide a wind power generator and yaw bearing replacement method for a wind power generator that make it possible to replace the yaw bearing using a simple device.

According to a first embodiment of the present invention for achieving the purpose described above, there is provided
a wind power generator comprising:
a tower having a top end portion and a bottom end portion, said bottom end portion being fixed to a base;
a yaw bearing having an upper portion and a lower portion, said lower portion being fixed to the top end portion of the tower;
a power generator main body being fixed to the upper portion of the yaw bearing such that the power generator is supported by the tower via the yaw bearing so as to freely rotate in a yaw direction, the power generator main body having a rotor rotatably supported by the power generator, and a power generator driven by a rotation of the rotor to generate electric power; and
a jack device having a lower fixing section to be fixed to the top end portion of the tower, and an upper fixing section to be fixed to a bottom surface of the power generator main body, wherein the jack device is to be mounted between the power generator main body and the tower such that the jack device is located around the yaw bearing, and the jack device is for jacking up the power generator main body relative to the tower;
wherein a first jack mounting section which the lower fixing section of the jack device is to be fixed to is provided on the top end portion of the tower, and the first jack mounting section is located radially outside of the yaw bearing,
a second jack mounting section which the upper fixing section of the jack device is to be fixed to is provided on the bottom surface of the power generator main body, and the second jack mounting section is arranged so as to face the first jack mounting section in the vertical direction; and
the jack device is to be mounted between the power generator main body and the tower such that an opening is formed for removing the yaw bearing from an inside of the mounted jack device, or for inserting the yaw bearing inside the mounted jack device.

According to a second embodiment of the present invention for achieving the purpose above, there is provided
the wind power generator of the first embodiment, wherein
the jack device is to be removably mounted between the power generator main body and the tower.

According to a third embodiment of the present invention for achieving the purpose above, there is provided
the wind power generator according to the second embodiment, further comprising:
a drive unit that is mounted to at least one of the first jack mounting section or the second jack mounting section, and that rotates the power generator main body in the yaw direction with respect to the tower,
wherein after the drive unit has been removed from the wind power generator, the jack device is mounted between the power generator main body and the tower.

According to another embodiment of the present invention for achieving the purpose described above, there is provided
a method for replacing a yaw bearing installed to a wind power generator;
the wind power generator having:
a tower having a top end portion and a bottom end portion, said bottom end portion being fixed to a base;
a yaw bearing having an upper portion and a lower portion, said lower portion being fixed to the top end portion of the tower; and
a power generator main body being fixed to the upper portion of the yaw bearing such that the power generator is supported by the tower via the yaw bearing so as to freely rotate in a yaw direction, the power generator main body having a rotor rotatably supported by the power generator, and a power generator driven by a rotation of the rotor to generate electric power;

the method comprising the steps of:

mounting a jack device between the power generator main body and the tower such that the jack device is located around the yaw bearing, the jack device having a lower fixing section to be fixed to the top end portion of the tower, and an upper fixing section to be fixed to a bottom surface of the power generator main body; and jacking up the power generator main body relative to the tower by the mounted jack device, wherein the jack device is mounted between the power generator main body and the tower such that an opening is formed for removing the yaw bearing from an inside of the mounted jack device, or for inserting the yaw bearing on the inside of the mounted jack device.

The following advantages can be obtained with the present invention:

(1) It is possible to jack up the power generator main body by the jack device that is mounted between a first and second jack mounting section, and by removing and inserting the yaw bearing through the opening of the jack device, it is possible to remove the yaw bearing using a suspension device such as a relatively small crane, winch or the like that can be installed on the power generator main body without having to lower the power generator main body to the ground.

(2) The jack device can be mounted to the wind power generator so that it is removable, and as a result it is possible to suppress an increase in cost of the wind power generator and an increase in weight during normal use.

(3) The jack device is installed in the mounting section of the drive unit when the drive unit is removed, so there is no need for a special installation section for installing the jack device, and thus it is possible to prevent the construction of the wind power generator from becoming complex.

Other features and advantages of the present invention will become apparent from the following detailed description, taken in conjunction with the accompanying drawings, which illustrate, by way of example, the principles of the invention.

DETAILED DESCRIPTION OF THE INVENTION

The present invention solves the problem of providing a wind power generator and yaw bearing replacement method for a wind power generator that make it possible to replace the yaw bearing using a simple device by placing a jig having a jack-up function between an outer flange, which protrudes toward the outer diameter side of an inner flange of the tower and that functions as the bearing seat of the yaw bearing, and the bottom surface of the nacelle, and removing the yaw bearing through a space in the jig by a crane that is provided on the nacelle with the yaw bearing suspended.

Embodiment 1

In the following a first embodiment of a wind power generator and yaw bearing replacement method for that wind power generator to which the present invention is applied is explained.

Figure 1:
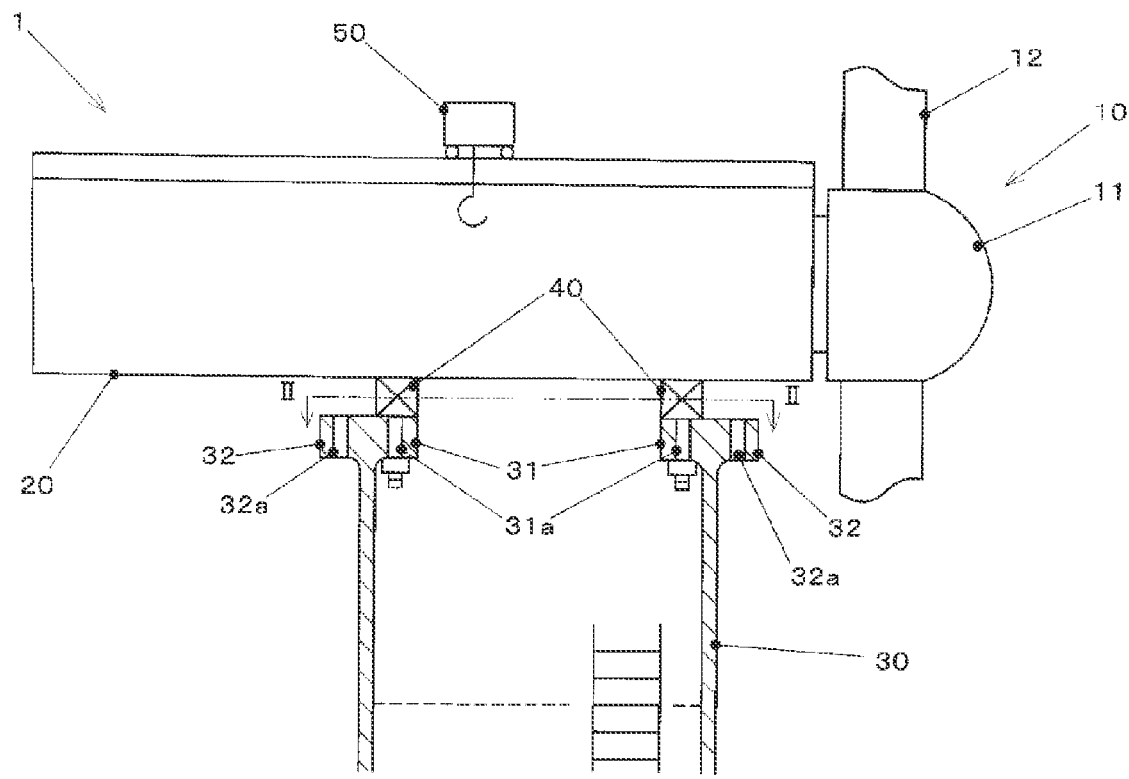
FIG. 1 is a schematic cross-sectional view of the connecting section between the nacelle and the tower in a first embodiment of a wind power generator to which the present invention is applied, and is a drawing that illustrates the state during normal operation.

FIG. 1 is a schematic cross-sectional view of the connecting section between the nacelle and tower of a wind power generator. The wind power generator 1 comprises a rotor 10, nacelle 20, tower 30, yaw bearing 40 and crane 50.

The rotor 10 is a wind turbine that rotates by receiving the force of the wind, and comprises a hub 11 and blades 12.

The hub 11 is provided in the center section of the rotor 10, and is supported by a bearing (not illustrated in the figures) such that it can rotate around a nearly horizontally placed axle.

A plurality of blades 12 are arranged such that they radially extend from the hub 11, and each blade has an airfoil section that generates torque by receiving the force of the wind.

The nacelle 20 is the portion that houses a generator that is rotated and driven by the rotor 10, and various kinds of auxiliary equipment such as a control panel, cooling device and the like.

The tower 30 is a support column that supports the nacelle 20 at a high location. The tower 30 is formed into a cylindrical shape and extends in the vertical direction. The bottom end section of the tower 30 is fastened to base section that is located on the ground, at the bottom of the ocean or floats on the sea.

The top end section of the tower 30 is connected to the bottom end section of the nacelle 20 by way of the yaw bearing 40. An inner flange 31 and an outer flange 32 are formed on the top end section of the tower 30. The inner flange 31 is formed so that it protrudes inward in the radial direction from the opening in the top end section of the tower 30. The inner flange 31 functions as a bearing seat that holds the yaw bearing 40. Bolt holes 31a are uniformly arranged in the circumferential direction around the inner flange 31, and bolts that fasten a fixed rolling ring on the bottom section of the yaw bearing 40 are inserted through these bolt holes 31a. The portion on the bottom surface section of the nacelle 20 that faces the inner flange 31 functions as a bearing seat that holds the yaw bearing 40. The fixed rolling ring on the top section of the yaw bearing 40 is fastened to the bottom surface section of the nacelle 20.

The outer flange 32 is formed such that it protrudes outward in the radial direction from the opening in the top section of the tower 30. The outer flange 32 and the bottom surface of the nacelle 20 that faces the outer flange 32 function as a jack seat to which a jig 100 having a jack-up function (described later) is attached. Bolt holes 32a are uniformly arranged in the circumferential direction around the inner flange 31, and bolts that are inserted through these bolt holes 32a fasten the jig 100.

The yaw bearing 40 is located between the bottom surface section of the nacelle 20 and the top surface of the inner flange 31 of the tower 30, and is a roller bearing that supports the nacelle 20 on the tower 30 such that the nacelle 20 can rotate in the yaw direction. The yaw bearing 40 comprises a fixed rolling ring that is fastened to the tower 30, a rotating rolling ring that is fastened to the nacelle 20 and rolling bodies that are located between these.

The crane 50 is attached to the top section of the nacelle 20, for example, and as a suspension unit has the capability of suspending, raising and lowering the yaw bearing 40. The crane 50 is attached to the top section of the nacelle 20 such that it can move over a rail that is located along the principal axis direction of the rotor 10. The crane 50 can be such that instead of being permanent, it is put in place as needed.

Next, the method of replacing the yaw bearing 40 in the wind power generator 1 described above will be explained. Replacement of the yaw bearing 40 is performed by inserting the jig 100, which has a jack-up function (described later), between the bottom surface section of the nacelle 20 and the outer flange 32 of the tower 30.

Figure 2:
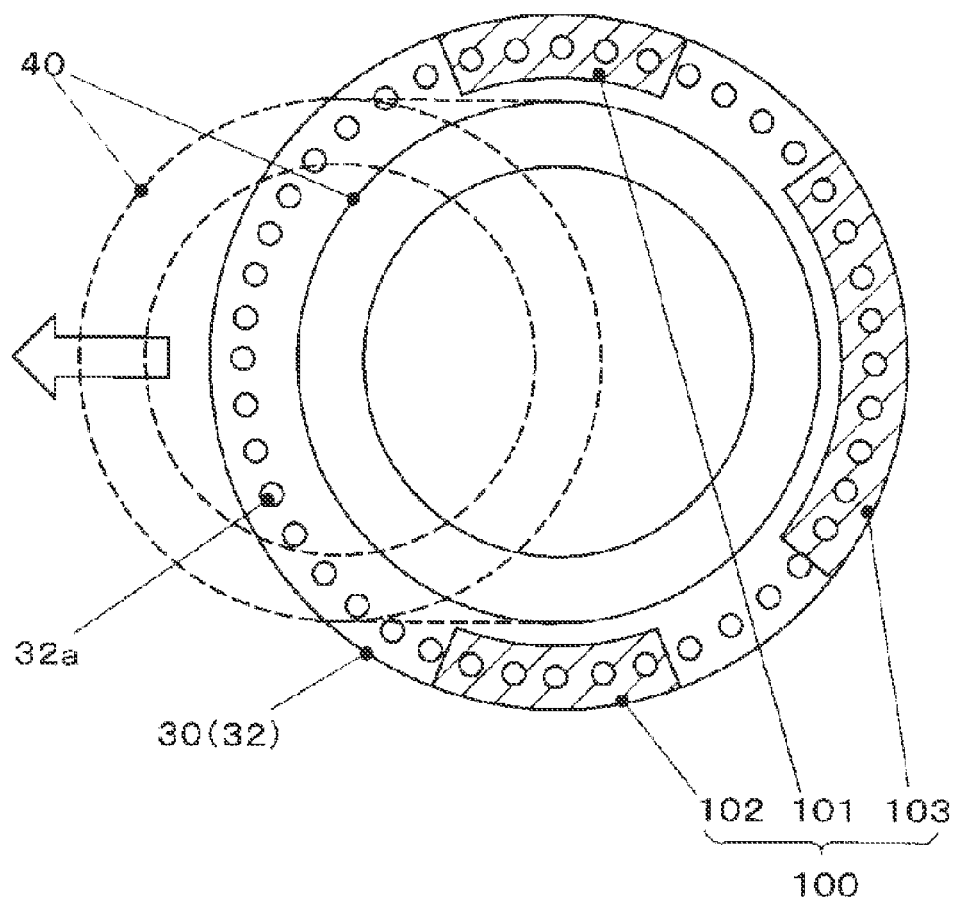
FIG. 2 is a cross-sectional view of section II-II in FIG. 1 (however, illustrates the state with a jig attached).
Figure 3:
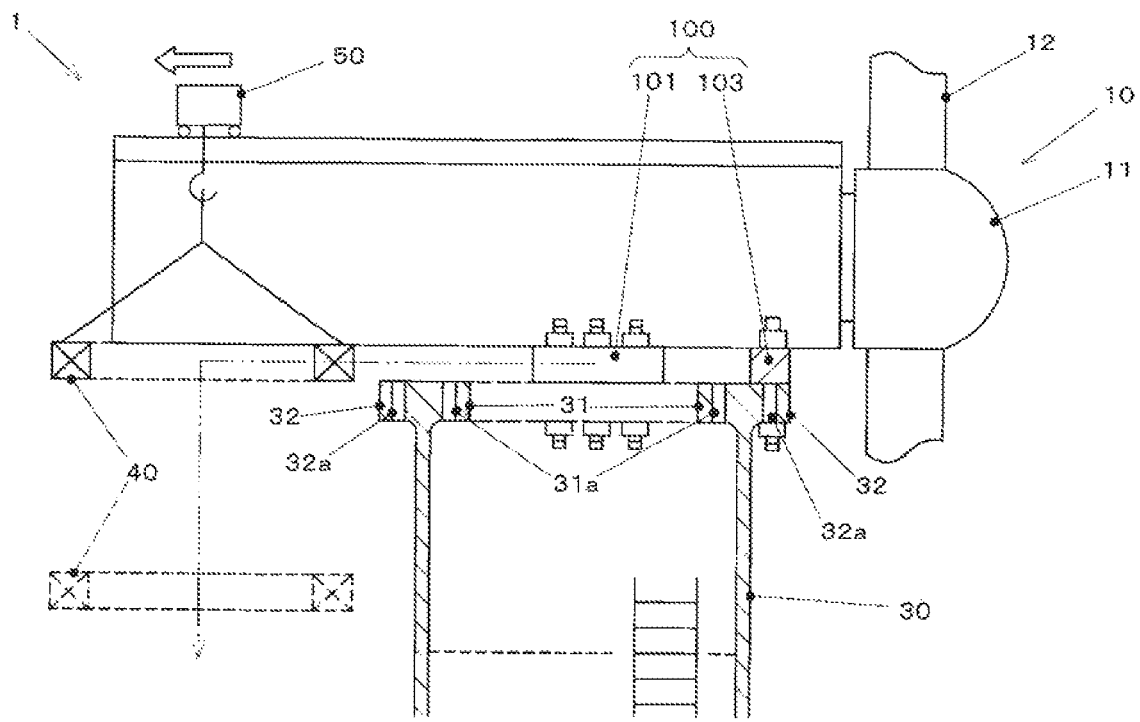
FIG. 3 is a schematic cross-sectional view of the connecting section between the nacelle and the tower of the wind power generator in FIG. 1, and is a drawing that illustrates the state during yaw bearing replacement.

FIG. 2 is a cross-sectional view of section II-II in FIG. 1, and illustrates the state in which the jig 100 is attached. FIG. 3 is a cross-sectional view that is the same as FIG. 1, and illustrates the state during yaw bearing replacement. The jig 100 comprises, for example, a first jig 101, a second jig 102 and a third jig 103. The planar shape of the first jig 101, the second jig 102 and the third jig 103 as seen in direction of the center axis of the yaw bearing 40 is a circular arc shape that is concentric with the tower 30, and these jigs are held between the outer flange 32 and the bottom surface section of the nacelle 20 that faces the outer flange 32 and fastened by bolts and nuts.

The first jig 101 and second jig 102 are located on opposite sides of the center axis of the tower 30. When seen from above, the straight line that connects the centers of the first jig 101 and second jig 102 is located such that it is nearly orthogonal to the direction of the axis of rotation of the rotor 10. The third jig 103 is located on the rotor 10 side in the middle section on the perimeter of the outer flange between the first jig 101 and second jig 102. Here, a space is provided between the first jig 101 and second jig 102 such that the yaw bearing can be removed or inserted from the side opposite that of the third jig 103. The first jig 101, second jig 102 and third jig 103 comprise a jack-up unit such as a hydraulic jack, and have the function of jacking up the nacelle 20 with respect to the tower 30.

By jacking up the nacelle 20 with respect to the tower 30 with the jig 100 (first jig 101, second jig 102, third jig 103) fastened to the wind power generator 1, and the bolts and nuts that fasten the yaw bearing 40 loosened, the yaw bearing 40 is in a free state, and by the crane 50 pulling on the yaw bearing 40, the yaw bearing can be removed from between the first jig 101 and the second jig 102. The yaw bearing 40 is moved in a horizontal direction to the position illustrated by the dashed lines in FIG. 2 and the solid lines in FIG. 3, after which, the wire from the crane 50 is changed such that the yaw bearing 40 is suspended, and the yaw bearing 40 is then lowered.

Next, a new replacement yaw bearing 40 is suspended by the crane 50, the wire is wound up and the yaw bearing 40 is raised. The yaw bearing 40 is raised to the position illustrated by the dashed lines in FIG. 2 and the solid lines in FIG. 3, the wire is switched, the yaw bearing 40 is then moved horizontally, placed on the inner flange 31 of the tower 30 and fastened. After that, the hydraulic pressure of the jack-up unit of the first jig 101, second jig 102 and third jig 103 is reduced and the nacelle 20 is lowered, and the bottom surface of the nacelle 20 and the yaw bearing 40 are fastened together. The first jig 101, second jig 102 and third jig are removed and the replacement work of the yaw bearing 40 is completed.

As explained above, with this first embodiment, the following advantages are obtained.

(1) A jig 100 having a jack-up unit that is mounted between the bottom surface of the nacelle 20 and the outer flange 32 jacks up the nacelle 20, and by removing the yaw bearing 40 and inserting a replacement yaw bearing 40 through the space between a first jig 101 and second jig 102, it is possible to replace the yaw bearing 40 using a relatively small crane 50 that is mounted on the nacelle 20.

(2) By mounting a jig 100 having a jack-up unit on the wind power generator such that it is removable, it is possible to suppress increased costs of the wind power generator, and to suppress an increase in weight during normal operation.

Embodiment 2

Figure 4:
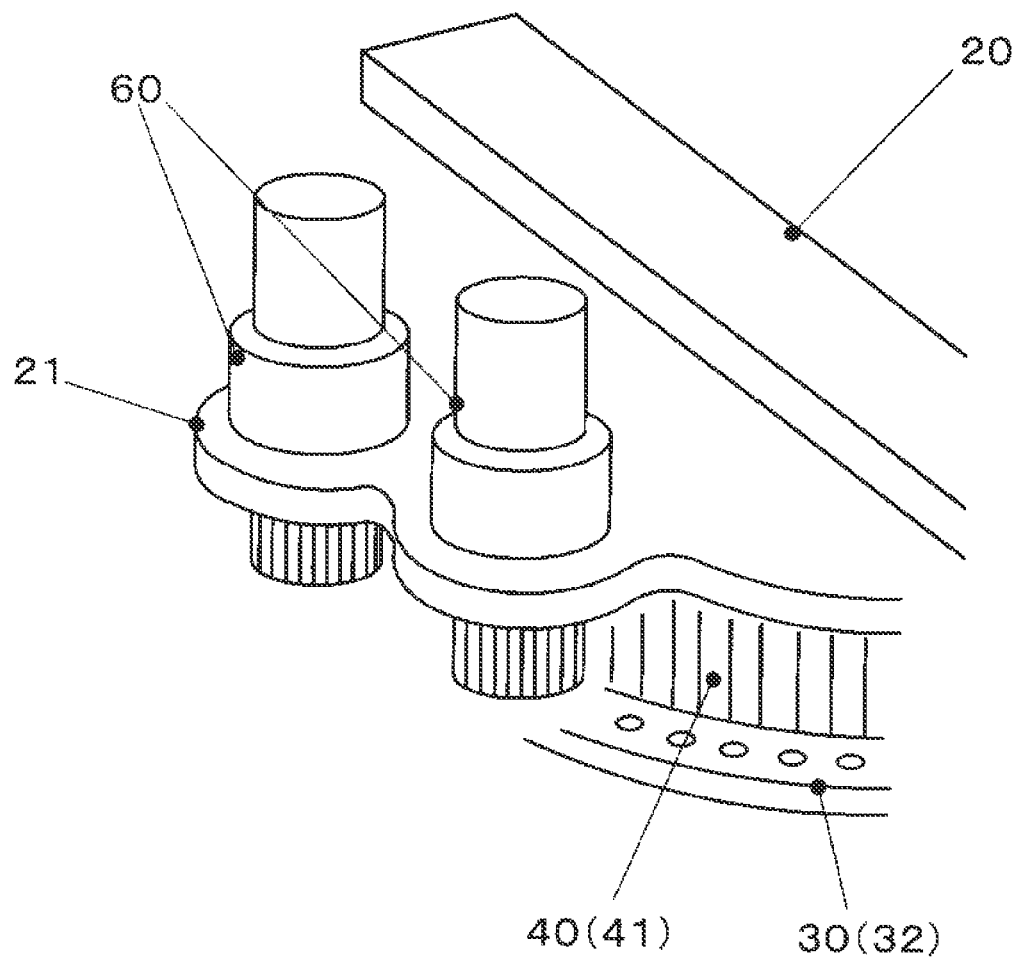
FIG. 4 is a schematic cross-sectional view of the connecting section between the nacelle and the tower in a second embodiment of a wind power generator to which the present invention is applied, and is a drawing that illustrates the state during normal operation.
Figure 5:
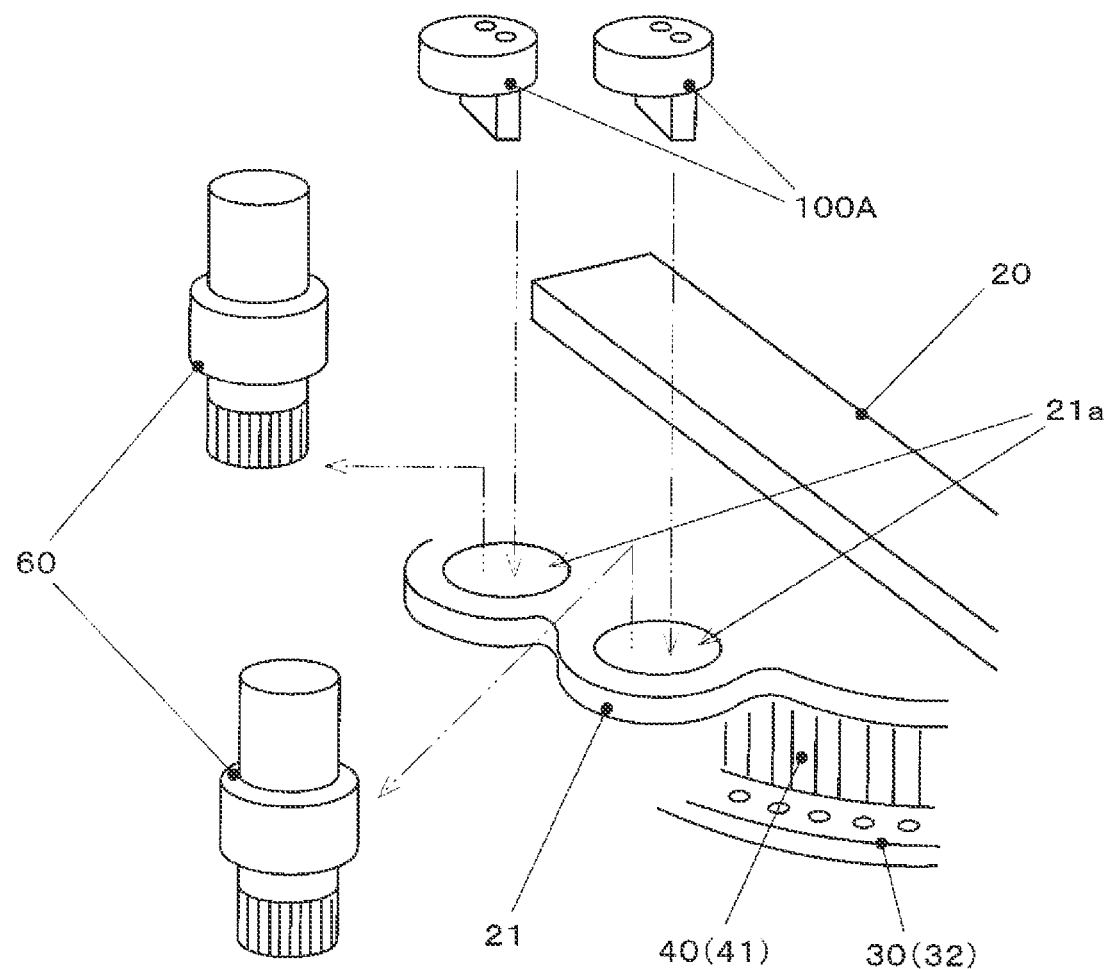
FIG. 5 is a drawing that illustrates the state during yaw bearing replacement of the wind power generator in FIG. 4.

Next, a second embodiment of a wind power generator and yaw bearing replacement method for that wind power generator to which the present invention is applied is explained. The same reference numbers will be assigned to locations that are essentially in common with those of the first embodiment described above, and any redundant explanation will be omitted, so that the explanation below centers on mainly the differences. FIG. 4 and FIG. 5 are enlarged schematic perspective views of the connecting section between the nacelle and the tower, where FIG. 4 illustrates the state during normal use, and FIG. 5 illustrates the state during yaw bearing replacement (replacement of the drive device and jig).

As illustrated in FIG. 4, a drive device installation section 21 is provided in the nacelle 20. The drive device installation section 21 is a flat member that horizontally protrudes toward the outside in the radial direction of the yaw bearing 40, and openings 21a are formed in the drive device installation section 21 for installing the drive devices 60. The drive devices 60 that rotate and drive the nacelle 20 by driving a gear 41 that is provided around the outer perimeter of the yaw bearing 40 are installed in the drive device installation section 21. A plurality of drive devices 60 is distributed in the circumferential direction around the yaw bearing 40. There are cases when the drive devices 60 interfere with the removal or mounting of the yaw bearing 40 above, so the drive devices 60 are removed during removal and mounting of the yaw bearing 40.

In this second embodiment, instead of the jig 100 of the first embodiment, jigs 100A, which are mounted in the openings 21a of the drive device installation section 21 after the drive devices 60 have been removed, are used. Similar to the jig 100, the jigs 100A comprise a function of jacking up the nacelle 20 with respect to the tower 30.

With the second embodiment described above, in addition to obtaining essentially the same advantages as the advantages of the first embodiment described above, there is no need to provide a special installation section for installing the jigs 100A, so it is possible to simplify the construction of the wind power generator.

(Variation)

The present invention is not limited to the embodiments described above, and different variations and modifications are possible, with those variations and modifications also being within the technical scope of the present invention.

(1) The shape, construction, location and quantity of jigs having a jack-up function, and the method of installing the jigs in the nacelle and tower are not limited to the construction of the embodiments described above, and can be appropriately modified.

(2) The suspension method such as a crane does not need to be provided during normal use of the wind power generator, and can be temporarily provided only during replacement of the yaw bearing.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A wind power generator comprising:
    a tower having a top end portion and a bottom end portion, said bottom end portion being fixed to a base;
    a yaw bearing having an upper portion and a lower portion, said lower portion being fixed to the top end portion of the tower;
    a power generator main body being fixed to the upper portion of the yaw bearing such that the power generator is supported by the tower via the yaw bearing so as to freely rotate in a yaw direction, the power generator main body having a rotor rotatably supported by the power generator, and a power generator driven by a rotation of the rotor to generate electric power;
    a drive unit that rotates the power generator main body in the yaw direction with respect to the tower; and
    a jack device having a lower fixing section to be fixed to the top end portion of the tower, and an upper fixing section to be fixed to a bottom surface of the power generator main body, wherein the jack device is to be removably mounted between the power generator main body and the tower such that the jack device is located around the yaw bearing, and the jack device is for jacking up the power generator main body relative to the tower; wherein
    a first jack mounting section which the lower fixing section of the jack device is to be fixed to is provided on the top end portion of the tower, and the first jack mounting section is located radially outside of the yaw bearing,
    a second jack mounting section which the upper fixing section of the jack device is to be fixed to is provided on the bottom surface of the power generator main body, and the second jack mounting section is arranged so as to face the first jack mounting section in the vertical direction,
    the drive unit is mounted to at least one of the first jack mounting section and the second jack mounting section, and
    after the drive unit has been removed from the wind power generator, the jack device is mounted between the first jack mounting section provided on the top end portion of the tower and the second jack mounting section provided on the bottom surface of the power generator main body such that an opening is formed for removing the yaw bearing from an inside of the mounted jack device, or for inserting the yaw bearing inside the mounted jack device.

2. The wind power generator according to claim 1, further comprising:
    a suspension device installation unit provided on the power generator main body for installing a suspension device that suspends the yaw bearing;
    wherein the suspension device moves the yaw bearing in the radial direction thereof while suspending the yaw bearing.

3. A method for replacing a yaw bearing installed to a wind power generator, the wind power generator having a tower having a top end portion and a bottom end portion, said bottom end portion being fixed to a base, a yaw bearing having an upper portion and a lower portion, said lower portion being fixed to the top end portion of the tower, a power generator main body being fixed to the upper portion of the yaw bearing such that the power generator is supported by the tower via the yaw bearing so as to freely rotate in a yaw direction, the power generator main body having a rotor rotatably supported by the power generator, and a power generator driven by a rotation of the rotor to generate electric power, and a drive unit that rotates the power generator main body in the yaw direction with respect to the tower, and that is mounted to at least one of a first jack mounting section provided on the top end portion of the tower and located radially outside of the yaw bearing and a second jack mounting section provided on the bottom surface of the power generator main body and arranged so as to face the first jack mounting section in the vertical direction, the method comprising the steps of:
    removing the drive unit from the wind power generator;
    after the step of removing, mounting a jack device between the first jack mounting section provided on the top end portion of the tower and the second jack mounting section provided on the bottom surface of the power generator main body such that the jack device is located around the yaw bearing, the jack device having a lower fixing section to be fixed to the first jack mounting section, and an upper fixing section to be fixed to the second jack mounting section; and
    jacking up the power generator main body relative to the tower by the mounted jack device,
    wherein the jack device is mounted between the power generator main body and the tower such that an opening is formed for removing the yaw bearing from an inside of the mounted jack device, or for insetting the yaw bearing on the inside of the mounted jack device.

4. The method according to claim 3, further comprising the steps of:
    mounting a suspension device that suspends the yaw bearing to the power generator main body; and
    removing the yaw bearing from the inside of the mounted jack device or for inserting the yaw bearing on the inside of the mounted jack device by moving the yaw bearing in the radial direction thereof while suspending the yaw bearing.

* * * * *